US010656988B1

(12) United States Patent
McElhinney et al.

(10) Patent No.: US 10,656,988 B1
(45) Date of Patent: May 19, 2020

(54) ACTIVE MONITORING OF PACKET LOSS IN NETWORKS USING MULTIPLE STATISTICAL MODELS

(71) Applicant: Amazon Technologies, Inc., Seattle, WA (US)

(72) Inventors: Conor Patrick McElhinney, Dublin (IE); Guillaume Boissier, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 15/721,181

(22) Filed: Sep. 29, 2017

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *H04L 41/0677* (2013.01); *H04L 41/142* (2013.01)

(58) Field of Classification Search
CPC .. G06F 11/079; G06F 11/0709; G06F 11/004; G06F 11/008; G06F 11/07; G06F 11/0703; G06F 11/0706; G06F 11/0793; G06F 11/3466; G06F 11/3476; G06F 11/3495; H04L 41/0677; H04L 41/06; H04L 41/0604; H04L 41/0609; H04L 41/0613; H04L 41/0618; H04L 41/0631; H04L 41/0636; H04L 41/065; H04L 41/14; H04L 41/142

USPC .............................................. 714/37, 43, 45
See application file for complete search history.

(56) References Cited

U.S. PATENT DOCUMENTS

| 6,718,376 | B1* | 4/2004 | Chu ................... H04L 41/0206 370/216 |
| 2008/0114581 | A1* | 5/2008 | Meir ....................... H04L 12/66 703/13 |
| 2010/0100775 | A1* | 4/2010 | Slutsman .............. G06F 11/079 714/47.2 |
| 2018/0121808 | A1* | 5/2018 | Ramakrishna .......... H04L 51/02 |

* cited by examiner

*Primary Examiner* — Anthony J Amoroso
(74) *Attorney, Agent, or Firm* — Klarquist Sparkman, LLP

(57) ABSTRACT

A computer implemented method includes determining a hierarchical graph of a network of entities. The method further includes determining event data from a plurality of events. The method also includes applying a plurality of statistical models on the event data corresponding to each of the plurality of events and the hierarchical graph. Each of the statistical models generates a model output data for each of the plurality of events. The method further includes generating a model output data based on the model output data corresponding to each of the plurality of statistical models by using a first cost function. The method also includes generating a set of data based on the model output data by using a second cost function. The method further includes determining one or more entities of the network experiencing packet loss based on the set of data.

19 Claims, 11 Drawing Sheets

ACTIVE MONITORING OF PACKET LOSS IN NETWORKS USING MULTIPLE STATISTICAL MODELS

BACKGROUND

Large computer networks, often used in cloud computing or other applications, may contain hundreds or thousands of components of several types, such as switches, routers, and hubs. Due to numerous factors, such as the complexity of the components and their numbers, it is likely that at some point, a network component may encounter a fault or otherwise cause problems that degrade the operation of the network. Management of large computer networks may therefore involve identifying network failures and locating the network component or components that contributed to or are otherwise responsible for the errors. However, detecting and, in particular, locating failed or malfunctioning network components remains a challenging endeavor.

Some approaches to locate the failed network components involve using various statistical techniques which may be used to form estimates of attributes. The attributes may identify components involved in a network fault. The success at discovering the network fault may vary between the various statistical techniques. Some of the causes of this variance may include network topology, network fault characteristics (for example percentage loss), and the raw data input from the network. Due to such variance, a given statistical technique may generate incorrect results regarding failed network components.

DETAILED DESCRIPTION

Figure 1:
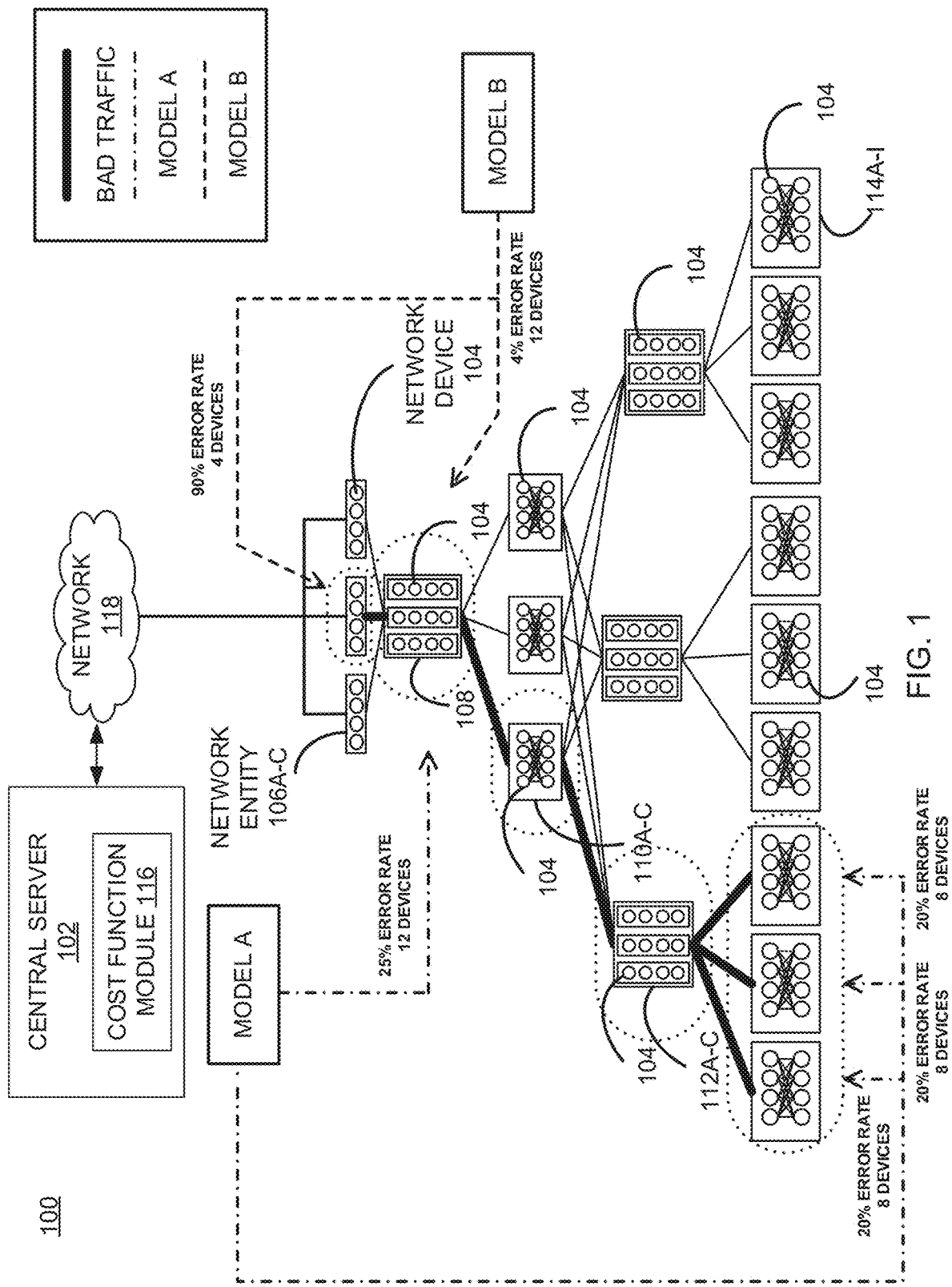
FIG. 1 illustrates a system on which various embodiments can be implemented.

In the following description, various embodiments will be illustrated by way of examples and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, Synchronous Optical Networks (SONET), Synchronous Digital Hierarchy (SDH) links, or Power Line Communications (PLC), and so forth. Various network architectures, such as Clos networks, can also be used.

Management of large computer networks often involves identifying network errors and locating the network component or components that are contributing to or are otherwise responsible for the errors. Network errors may include packet loss, traceroute loss, latency, congestion, and so forth.

The terms "network components" and "components" may be used interchangeably in the present disclosure to identify any of the most generalized aspects of a network. Components can include computers (such as client or server computers), cables, outlets, monitors, software, firmware, equipment racks, etc. Although many of the strategies disclosed herein pertain to identifying components such as faulty switches or routers (network entities, described below), the same or similar approaches may also be used to identify more passive components such as fiber-optic cables, cat5/6 Ethernet cables, etc.

The terms "network entities" and "entities" may be used interchangeably in the present disclosure to identify computing resource subsets of network components. Network entities can include computers (e.g., servers), switches, routers, storage devices, or any other network component that performs some form of active computational task. Network entities do not include passive components such as fiber optic cables, cat5/6 cables, keyboards, mice, etc., though it is noted that links such as Bluetooth and WiFi each require modems that would qualify as network entities, although the actual communication channels between them (similarly to fiber optic links) do not.

The terms "network devices" and "devices" may be used interchangeably in the present disclosure to identify subsets of network entities that cannot be further sub-divided from a network perspective (e.g., individual client computers, virtual machine instances (VMI's), etc.). In this disclosure, network devices are intended to refer to network elements that do not house further network elements nor communicate with network elements in subsequently lower aggregation layers than themselves as further described below.

Systems and methods in accordance with various embodiments of the present disclosure provide some ways to identify components in a network that may be experiencing various forms of network error such as packet loss, traceroute loss, etc.

As a network is monitored, communication data between network entities may be observed, recorded, and/or evaluated. Often, a network monitor will return negative results (no network errors) on a regular basis as different points in the network are tested and re-tested for communication faults. In some circumstances, however, a network error (or suspected network error) may be detected, and a computing device (such as a server computer) may flag one or more suspected entities and/or data paths relating to the detected network error for further analysis. The flagged components may encompass each flagged entity, and in addition may include other entities in proximity to the suspected entities, entities along data paths associated with the entities, etc. Upon being flagged, raw data sets (also referred to as "event data" sets) may be collected from the associated entities; alternatively, event data sets may have already been collected in anticipation of potential network errors and may simply need to be loaded. In collecting event data sets, the server may monitor and record packet or traceroute loss between a network entity source and a network entity destination. The event data sets may be stored in volatile or non-volatile memory or any other form of storage medium, and may be used as inputs into a plurality of statistical models which may, in turn, produce a plurality of statistical model output data sets. Different statistical models can be used to exploit different patterns in the input event data sets in an attempt to locate different potential sources of the detected network error. This can be beneficial, because different statistical models will often produce different predictive outcomes for the source(s) of a network error based on the same input event data sets. Differences in models may include differences between suspected entity identification(s) (who is or is not to blame?), number of suspected entities, entity probability error rates, and so forth. By employing different statistical models, event data sets can be simultaneously exploited in various ways to determine a network error source with greater probability than any single statistical model alone could provide.

A first cost function (described below) can be applied to the differing model output data sets. The first cost function can evaluate (or "push") the output data sets in different directions (depending on the model) to converge on differing final suspected entity identities, numbers of entities, and entity error rates in accordance with the particularly applied model and various cost function settings. Thus, each statistical model can independently evaluate different hypothetical network error scenarios. Additionally, the first cost function may apply various preferential data filters to each output data set to arrive at a unique, model-specific conclusory evaluation of the network error for each output data set. By applying multiple statistical models on data obtained from multiple events, potentially malfunctioning network devices may be accurately identified in spite of any variations or random noise within the network.

A topological network map, or hierarchical aggregation graph, can be assembled in response to a detected network error reflecting the targeted suspected entities, paths, etc. associated with the potential network error. Based on the graph, the applied statistical models and first cost function may be applied preferentially to entities associated with the detected network error to conserve computational resources and more rapidly evaluate the network error source(s). The graph is generally a topological rank of network entities based on an attribute such as network entity aggregation; that is, the server may assemble the aggregation graph and rank entities in the graph as having greater or lesser degrees of network entity aggregation. For example, an entity may be ranked based on the number of entities it is in relation to "within", "beneath" or "above" other network entities. One analogy could be determining the source of a power failure in a house as being within the house (e.g., the oven, low aggregation), near the house (e.g., the nearest transformer, higher aggregation), or far from the house (e.g., at the power station, highest aggregation). Thus, in some instances, entities with lower levels of hierarchical aggregation may be referred to as "downstream" relative to entities with higher levels of hierarchical aggregation, which may be referred to as "upstream" based on the aggregation of hierarchical communication channels.

In some embodiments, entities resident within a network entity (such as a RAID drive in a RAID array) can be considered sub-entities of the parent entity without necessarily being considered "below" the network entity (instead, "within"), since each sub-entity may share a same number of "downstream" communication links by virtue of proximity, physical housing, etc. In various embodiments, sub-entities may be considered as constituents of a parent entity unaffiliated with any other parent entity. This distinction may arise if the sub-entity "hops" through the parent entity to communicate with the exterior network, indicating that the sub-entity is not directly in communication with other entities outside of the parent entity. Thus, the parent entity may be categorized as an exclusive communication intermediary between the various sub-entities and the external network.

Once the graph has been generated, the server may traverse the graph using the first cost function in relation to the plurality of applied statistical models. Traversal usually begins at a (downstream) leaf (lower aggregation) layer, and may gradually proceed through upstream parent (higher aggregation) layers until the first cost function decides no further information may be gained and terminates. This approach can minimize the number of likely network error candidates, because layers of lower aggregation communicate with fewer entities than layers of higher aggregation; thus, the first cost function begins with the fewest number of network error candidates and gradually expands the pool.

Once the first cost function for each model has terminated in what is considered to be the minimum number of likely network error candidates (and their associated weights), the server can apply a second cost function to each of the first cost function model results. The purpose of the second cost function is to decide which of the first cost function results are the most likely to be accurate, and to choose that model (and its associated entities and weights) as the most likely to be accurate. Additionally, however, the second cost function can decide to collate, compare, or otherwise combine some of the data between various first cost function results from differing models to arrive at a unique and even more accurate network error assessment than would be possible by any of the available statistical models alone. For example, three different models might each blame an entity with varying weights, but otherwise differ in entity identities, numbers, or weights. However, the second cost function may interpret the model consensus to indicate that the blamed entity must at least be partially involved in the network error. A second example could be using statistical models that relate to network error proximity and time. For example, as the first cost function traverses a graph, it may take note of the observed network errors along a given path and the time that each of the observed network errors occurred. Based on these first cost functions, the second cost function could correlate the rate of identified network errors based on the location (proximity) of the first cost function(s)

to give a network error map or "blast radius" as errors become closer to the network error "epicenter".

In some embodiments, other factors can be taken into account when deciding to traverse the graph. For instance, if one-hundred entities in a given hierarchical layer are each considered 1% responsible for a network error, but one parent entity above them is considered responsible for 100% of the network error, the parent entity is most likely responsible for the error as opposed to all one-hundred of the lower aggregation entities. In contrast, if there are one-hundred low-aggregation entities, but two of them are determined to be 50% responsible for a network error (in a given model), and each shares a common parent entity considered to (still) be 100% responsible, it is more likely that each of the two entities are responsible and not the parent entity. This is similar to analogizing that a house with fifty ovens may be weighted differently in determining the power outage source than a house with only one. Other entity groupings can also be implemented which may involve different network aspects such as the number of connections shared by a corresponding (or parent) entity, an entity or device type, a packet loss or traceroute metric, or in any other way.

FIG. 1 illustrates a system 100 for implementing aspects in accordance with various embodiments. The system 100 includes a central server 102 (hereinafter referred to as "the server 102") and a plurality of network devices 104 arranged in a network system. As illustrated in FIG. 1, the various devices 104 have been arranged into entity groupings 106A-C, 108, 110A-C, 112A-C, and 114A-I.

The network devices 104 may include devices such as, but not limited to, gateways, routers, network bridges, modems, wireless access points, networking cables, line drivers, switches, hubs, repeaters, hybrid network devices (e.g., multilayer switches), protocol converters, bridge routers, proxy servers, firewalls, network address translators, multiplexers, network interface controllers, wireless network interface controllers, and so forth. The plurality of network devices 104 may be interconnected with each other by various methods. In some embodiments, the network devices 104 may be grouped into a plurality of entities such as 106A-C, 108, 110A-C, 112A-C, and 114A-I. Each entity may include one or more network devices 104. In some embodiments, the network devices 104 may be connected to each other using wired links, such as, but not limited to, telephone lines, fiber optic cables and so forth. In some other embodiments, the network devices 104 may be interconnected with each other using wireless communication links, such as radio waves, cellular networks, and so forth.

In some embodiments, an interconnection between the network devices 104 may define a network topology. The network topology may be classified into two categories, namely physical topology and logical topology. In some embodiments, the physical location and network connections between the network devices 104 may define the physical topology, while data flow among the network devices 104 may define the logical topology. Further, edges between the network devices 104 in the logical topology may be logical connections. Examples of such logical connections include communication interfaces, logical links, device aggregation and so forth. In alternative embodiments, the network topologies may be segmented into topological areas such as, buildings, cities, countries, regions and so forth. An example of network topology is a LAN that exhibits both a physical topology and a logical topology. Any given node in the LAN may have one or more links to one or more other nodes in the network, and the mapping of these links and nodes onto a graph results in a geometrical shape that determines the physical topology of the network. Likewise, the mapping of the flow of data between the nodes in the network determines the logical topology of the network.

As stated, the network topology may be abstracted to any one or more aggregated network topologies based on the various classifications of entities in the hierarchical aggregation. In some embodiments, hierarchical aggregation of the network devices 104 into entities may include computing a hierarchical graph that includes all the valid aggregations (permutations) of the network devices 104 and/or entities from an edge or a node to a highest topological layer. In an example, the valid aggregations from an edge or a node may be generated based on data related to the corresponding edge or node. Further, the highest topological layer may correspond to the largest aggregation area, for example, a building containing all the network devices 104. The hierarchical graph enables traversing from a leaf node to a parent node. As previously stated, the leaf node is usually the least aggregated, while the parent node is the most aggregated.

The network devices 104 may be grouped into a respective entity based on similarity among the network devices. In some other embodiments, the network devices 104 are grouped together based on one or more attributes including, but not limited to, a device type, a device function, and a geographic location. The type of device may include manufacturer details, functionality, and hardware and/or software (e.g., software version) configuration of the device. Similarly, the network devices 104 may also be arranged into different hierarchical layers based on the one or more attributes. For example, a layer in the hierarchical graph may include one or more firewalls, while a lower layer may include all the routers connected with the one or more firewalls.

In some embodiments, the network devices 104 may be communicably coupled to the server 102 via a network 118. The network 118 may include a data network such as, but not restricted to, the Internet, a Local Area Network (LAN), a Wide Area Network (WAN), a Metropolitan Area Network (MAN), etc. In certain embodiments, the network 118 may include a wireless network. The network 118 may further include a circuit-switched voice network, a packet-switched data network, or any other network capable for carrying electronic communications. In some embodiments, the network 118 may utilize various protocols such as, but not limited to, the Internet protocol (IP), Asynchronous Transfer Mode (ATM), or File Transfer Protocol (FTP) for the communication between the network devices 104.

In some embodiments, the server 102 manages various aspects of the system 100. For example, the server 102 can determine the hierarchical graph of the network devices 104 and associated entities 106A-C, 108, 110A-C, 112A-C, and 114A-I. In some embodiments, the server 102 identifies the corresponding layer of an entity based on the type of network devices within the entity 106A-C, 108, 110A-C, 112A-C, and 114A-I.

The server 102 may use various network diagnostic tools or commands to identify point-to-point packet losses, packet routes, or transit delays during normal network operation to compile event data sets for various network entities. The server 102 may use network diagnostic tools such as, but not limited to, traceroute, netstat, ipconfig and so forth. In an embodiment, the server 102 uses traceroute for the diagnosis of the system 100. Traceroute is a computer network diagnostic tool for displaying routes or paths of the packets, and measuring transit delays of packets across an Internet Protocol (IP) network. In some embodiments, the server 102 may periodically evaluate packets and use or intercept traceroutes to determine packet routes and packet loss counts. The server 102 may further record event data sets related to the losses. The event data may include packet loss metrics, packet transit routes, transit delays of the packets and so forth. In an embodiment, the packet loss metric may indicate a probability of a packet to be lost during transit from a source to a destination. The packet transit route may provide a location of at least one entity at each hierarchical layer involved in the transmission of the packet from the source to the destination. The transit delay of a packet may refer to the time taken for the packet to be transmitted across a network from the source to the destination. In another embodiment, the event data may further include a count of total packets transmitted and lost during an event.

The server 102 can apply collected event data sets from various network entities for use as one or more input(s) to the plurality of statistical models. The first cost function can then be applied to the model output data from each respective model to decide how far to iterate through the hierarchical graph, and which network entities to consider as being potentially responsible for a network error based on the respective model. The first cost function can also determine the weights to which a network entity may be blamed.

Specifically, FIG. 1 illustrates first cost functions applied to differing statistical models "MODEL A" and "MODEL B". As previously stated, each model may have various particular goals, which could cause the first cost function of the model to perform many widely varied or unexpected analyses of potential network error sources. However, this diversity allows the system to statistically evaluate numerous models and scenarios, and then incorporate the second cost function to cast the deciding vote (or combine different model analyses). In FIG. 1, a network error has been detected and models A and B have been chosen to determine the network error source(s). Each cost function begins at the lowest layer of aggregation of FIG. 1 (entities 114A-C), but evolves in different ways depending on the model and associated first cost function. For example, MODEL A and MODEL B each initially compare entities 114A-C at the lowest level of aggregation of the detected network error. MODEL A assigns the same probability error rates to each entity 114A-C (20%). Based on the characteristics of MODEL A, the first cost function pushes the server to continue traversing the graph into higher network aggregation layers for more information. Eventually, the first cost function proceeds to network entity 108 (with a 25% error rate) at which point the first cost function concludes that there is likely no further information to gain from traversing into higher aggregation layers and elects to terminate. MODEL A concludes that 114A-C (collectively) are the most likely network error candidates with 60% assurance while entity 108 has a smaller 25% probability error rate. In contrast, MODEL B concludes that none of the lower three hierarchical layers satisfy the first cost function requirements for the model, and thus traverses the graph until reaching entities 108 and 106B. Thus, MODEL B concludes that a 4% probability error rate exists for entity 108, but a 90% probability error rate exists for entity 106B. In this circumstance, it would be expected for the second cost function to conclude that MODEL B is the most accurately reflective model due to the 90% rate of confidence, which would normally be the case. However, it is noted that the second cost function itself may be configured to detect different scenarios (such as identifying who is affected by an outage rather than who is responsible for the outage), and thus the second cost function is also able to move in either direction.

Each statistical model may generate a set of assumptions based on a set of data. Further, each statistical model may relate one or more random variables to other random or non-random variables for generating the model output data. The model output data can include one or more attributes generated by the corresponding statistical model. The attributes may include, but are not limited to, a location of at least one entity in the hierarchical graph, a number of network devices corresponding to the at least one entity and a packet loss data metric for the at least one entity. In an embodiment, the attributes may further include entity loss data, event loss data, entity event loss, and a number of sub-entities. The entity loss data may include a total number of packets lost by an entity as estimated by the corresponding statistical model. The event loss may be defined as a number of packets lost during an event. The entity event loss may be defined as a ratio between the entity loss to the event loss. The number of sub-entities includes a number of child entities of a given entity in the hierarchical graph. For example, referring to FIG. 1, the entity 112 has three sub-entities 114. In some embodiments, the model output data may further include various statistical analyses of attributes such as mean, median, minimum, maximum etc. In some other embodiments, the model output data may include various loss functions such as, but not limited to, minimax, invariance and so forth. In other embodiments, the model output data may also indicate which layer in the hierarchical graph contains maximum entity event loss while biasing towards the lower aggregation nodes in the hierarchical graph. For example, the model output data may indicate a layer in the hierarchical graph with maximum entity event loss and a minimum number of sub-entities. In some embodiments, the statistical model may implement techniques such as, but not limited to, expectation maximization or stochastic gradient, descent to generate the model output data. These techniques may be used to form estimates of the model output data corresponding to the statistical model.

In some embodiments, the server 102 includes a cost function module 116. The cost function module 116 may include a set of computer readable instructions that are executed by the server 102 to implement the first and second cost function. In some embodiment, the server 102 may use the first cost function to select the model output data of at least one statistical model based on a first predetermined criterion. The first predetermined criterion may include maximizing the packet loss metric per device. In some embodiments, the first predetermined criterion may include selection of the model output data based on the comparison between packet loss metrics generated by the statistical models. In some other embodiments, the first predetermined criterion may include selection of a statistical model based on a size of deltas between the entity event loss of two statistical models relative to the size of deltas between the number of sub-entities of the two statistical models. The size of deltas may refer to a difference between corresponding values generated by the two statistical models. In some embodiments, the output data corresponding to event data sets includes one or more attributes associated with the model output data of the selected statistical model. In some other embodiments, the model output data corresponding to each event includes one or more attributes associated with two or more statistical models. In an embodiment, the model output data may include various attributes, such as, but not limited to, a set of entities in a hierarchical aggregation, a layer of each entity of the set in the hierarchical graph, a number of sub-entities for the set of entities and an entity event loss for each entity of the set. The layer of an entity may indicate a location of one or more entities experiencing packet loss. The set of network entities includes a total number of entities involved in loss of packet data.

In an embodiment, the server 102 generates a set of data based on the model output data of each event by using a second cost function. In some embodiments, the server 102 may execute the cost function module 116 to select the model output data of at least one event based on a second predetermined criterion. The second predetermined criterion may include maximizing the packet loss metric per device. In some embodiments, the second predetermined criterion may include selection of the model output data that provides the maximum entity event loss while minimizing the number of entities. The second cost function may provide greater weight towards entities located at lower layers in the hierarchical graph, thereby minimizing the number of sub-entities. In some embodiments, the set of data is a generalized result set based on the model output data corresponding to one of the plurality of events. In some other embodiments, the set of data is a generalized result set based on the model output data corresponding to two or more events. In alternative embodiments, the generalized result set may include attributes that are mathematical derivatives of the model output data. In an embodiment, the set of data may include various attributes indicative of one or more entities experiencing packet loss. The attributes may include physical location of the network devices 104 corresponding to the one or more entities. The attributes may also include hierarchical layer of the one or more network entities in the hierarchical graph. The attributes may further include entity event loss of the one or more entities. In some embodiments, the attributes may include a packet loss metric that may be expressed as a percentage of a total packet loss of the network. In other embodiments, the set of data may also include a cause of packet loss in the network. The cause may include connection path loss, network device failure, and so forth.

As can be seen in FIG. 1, computation of various entities along the determined "bad traffic" (or lossy) in comparison with two different MODELS "A" and "B" results in two different analyses of probabilistic system failure. As can be seen, MODEL A blames the neighbor of the problem but also blames multiple other areas of the network. MODEL B, on the other hand, primarily blames the problem entity but also blames in a minor way another entity. By combining the statistical and topological information multiple cost functions can be constructed. This information includes, but is not limited to, number of entities, number of sub entities, layer of aggregation and entity_event_loss, etc. In embodiments it may be desirable to maximize the total entity_event_loss while minimizing the error/failure "blast radius", for example, the number of entities and sub_entities. However, it may also be desirable to include the relative distances between entities, or any other metrics.

The server 102 also determines the one or more entities based on the set of data. In some embodiments, the server 102 may perform an action on the one or more entities to prevent or reduce further packet loss in the network. In another embodiment, the server 102 may perform the action on one or more network devices 104 corresponding to the one or more entities experiencing packet loss. The action may include, but not limited to, device shutdown, rerouting traffic from the device, control the device to reject traffic, and so forth. In some other embodiments, the action may include flagging the network devices 104 of the one or more entities in order to notify the other entities of the system 100 about the problem.

In an embodiment, the server 102 may perform active monitoring of the network of entities by periodically sending packets of data and determining if one or more entities are experiencing packet loss. In other embodiments, the server 102 may send requests to all the entities of the network for packet loss data. The server 102 may receive the packet loss data from the entities and identify the one or more entities experiencing packet loss.

Figure 2:
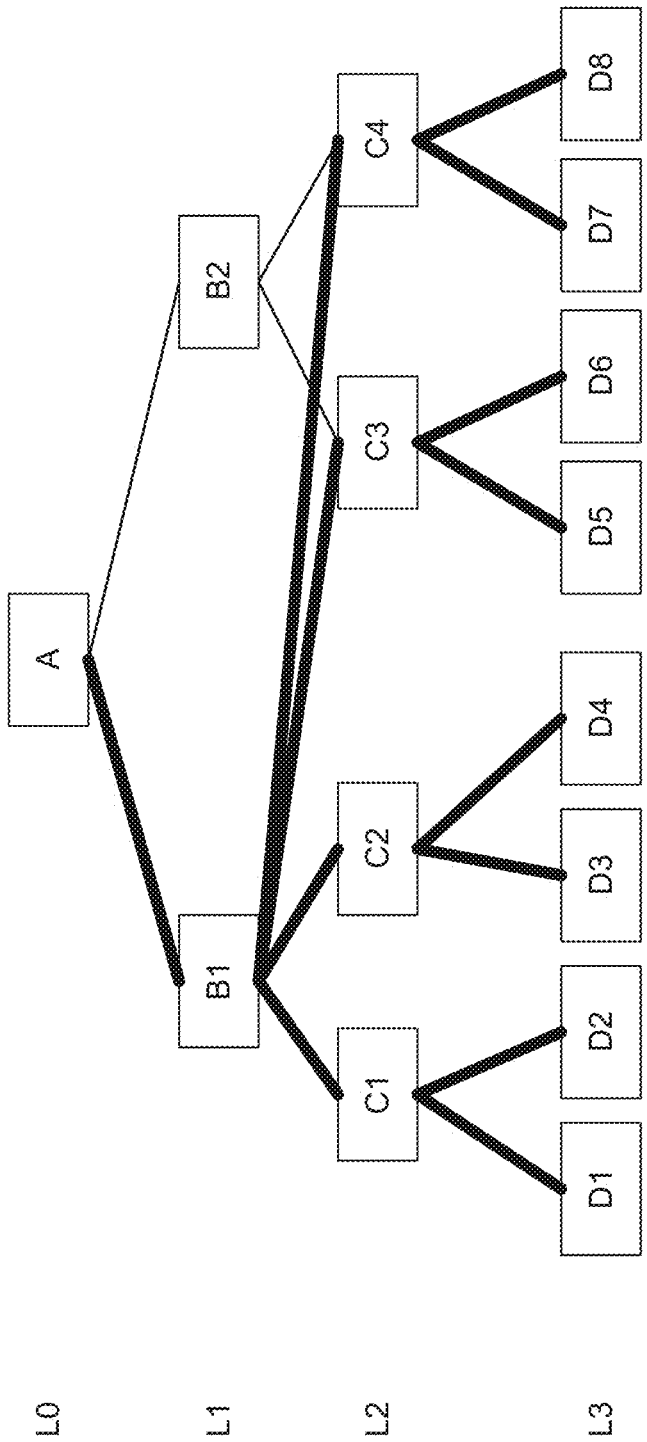
FIG. 2 illustrates an algorithm iteration in a network system according to an embodiment of the present disclosure.
Figure 3:
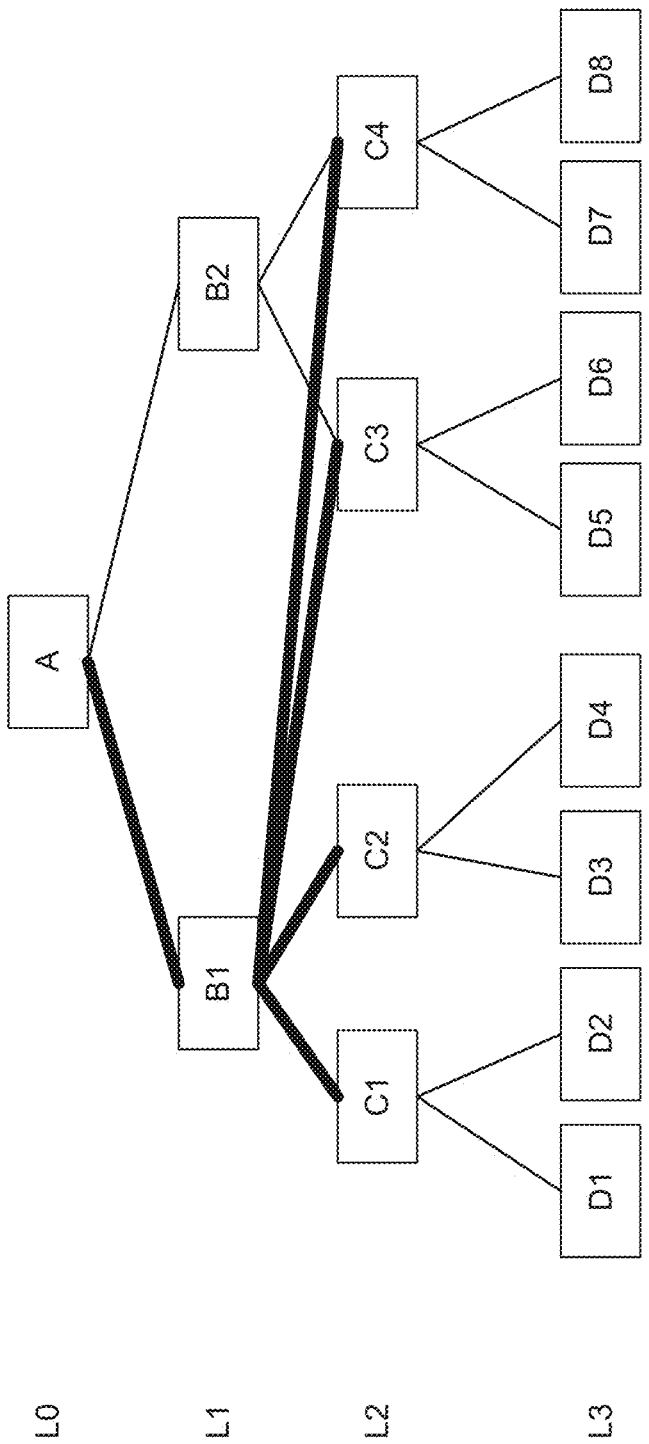
FIG. 3 illustrates an algorithm iteration in a network system according to an embodiment of the present disclosure.
Figure 4:
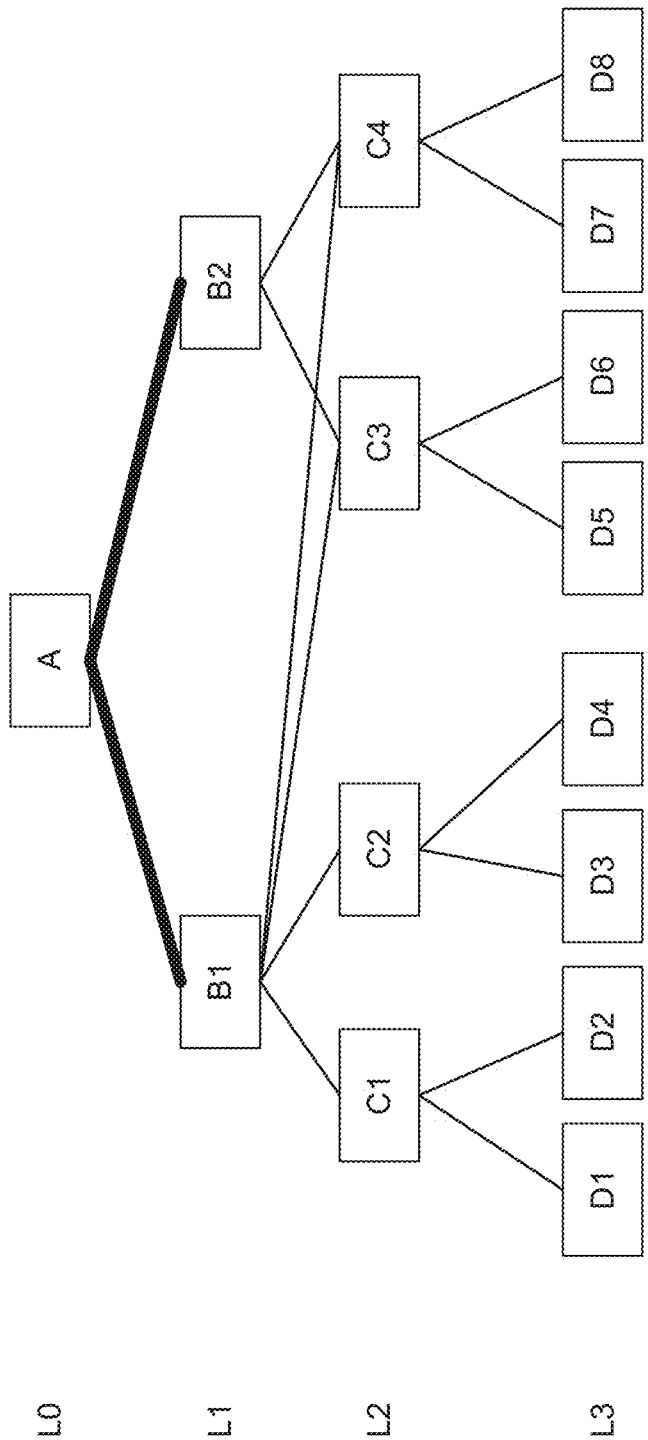
FIG. 4 illustrates an algorithm iteration in a network system according to an embodiment of the present disclosure.

FIGS. 2-4 illustrate sample statistical model evaluations with 100% failure at each layer. Once a layer has been discarded by the first cost function in conjunction with an applied model, it could traverse the layer in favor of the next most aggregate layer. In FIGS. 2-4, the algorithm makes a simple decision to go "left" at every possible junction because the first cost function has not gained any information by traversing the various layers. However, numerous techniques for triangulating network elements could also be used. Eventually, in FIG. 4, it can be seen that each entity is eventually evaluated.

Figure 5:
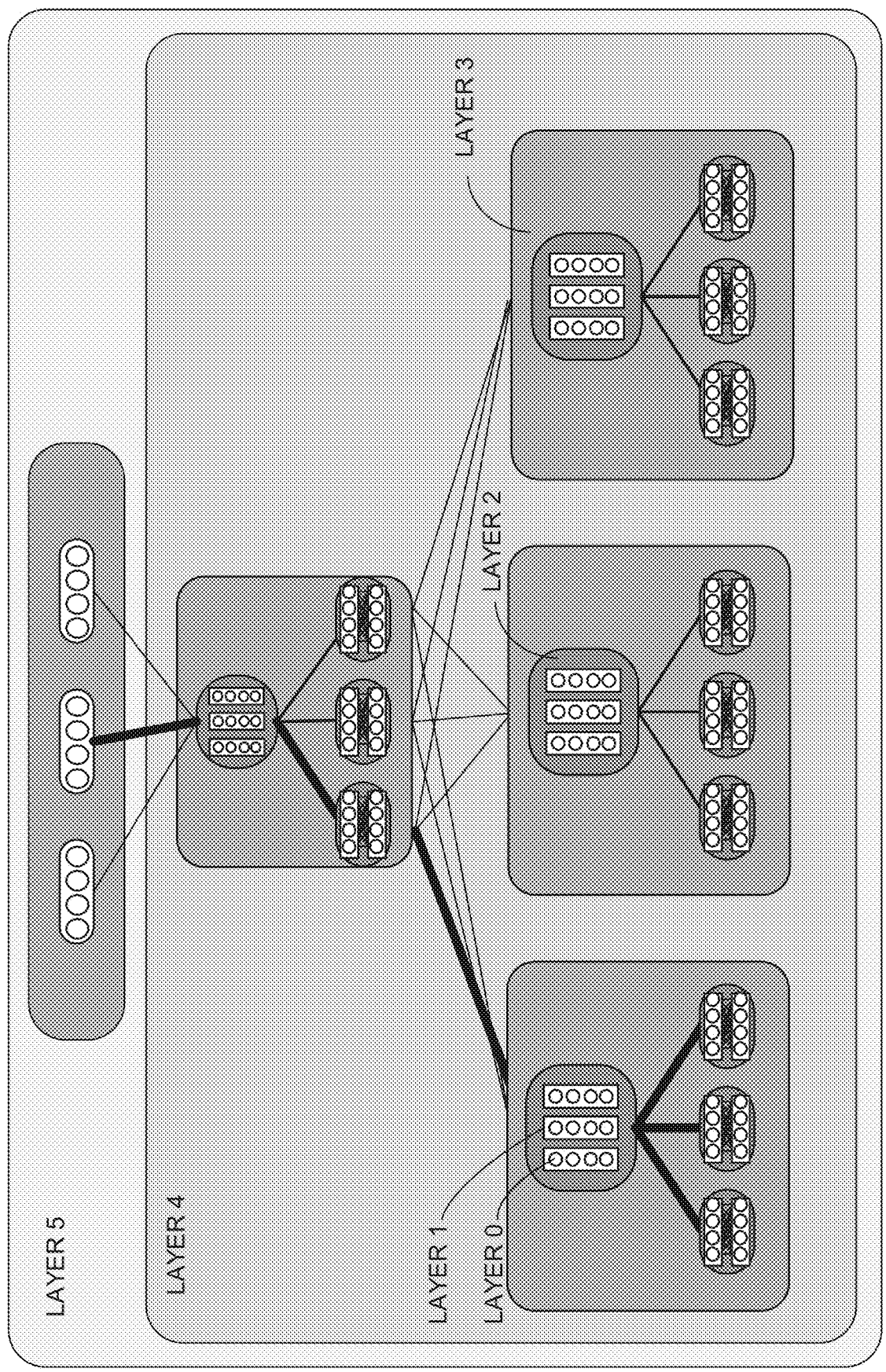
FIG. 5 illustrates hierarchical aggregation layers according to an embodiment of the present disclosure.

FIG. 5 illustrates some varying layers of aggregation in the depicted network. In FIG. 5, six layers of differing levels of aggregation are illustrated (layers 0-5). Similarly to FIG. 1, the same data paths have been highlighted. In FIG. 5, the aggregation proceeds from a layer 0 "device" layer (the lowest layer of aggregation that cannot be further subdivided from a network perspective) to the "universe" layer (layer 5) that contains each entity in the visible network from the perspective of the server 102.

Figure 6:
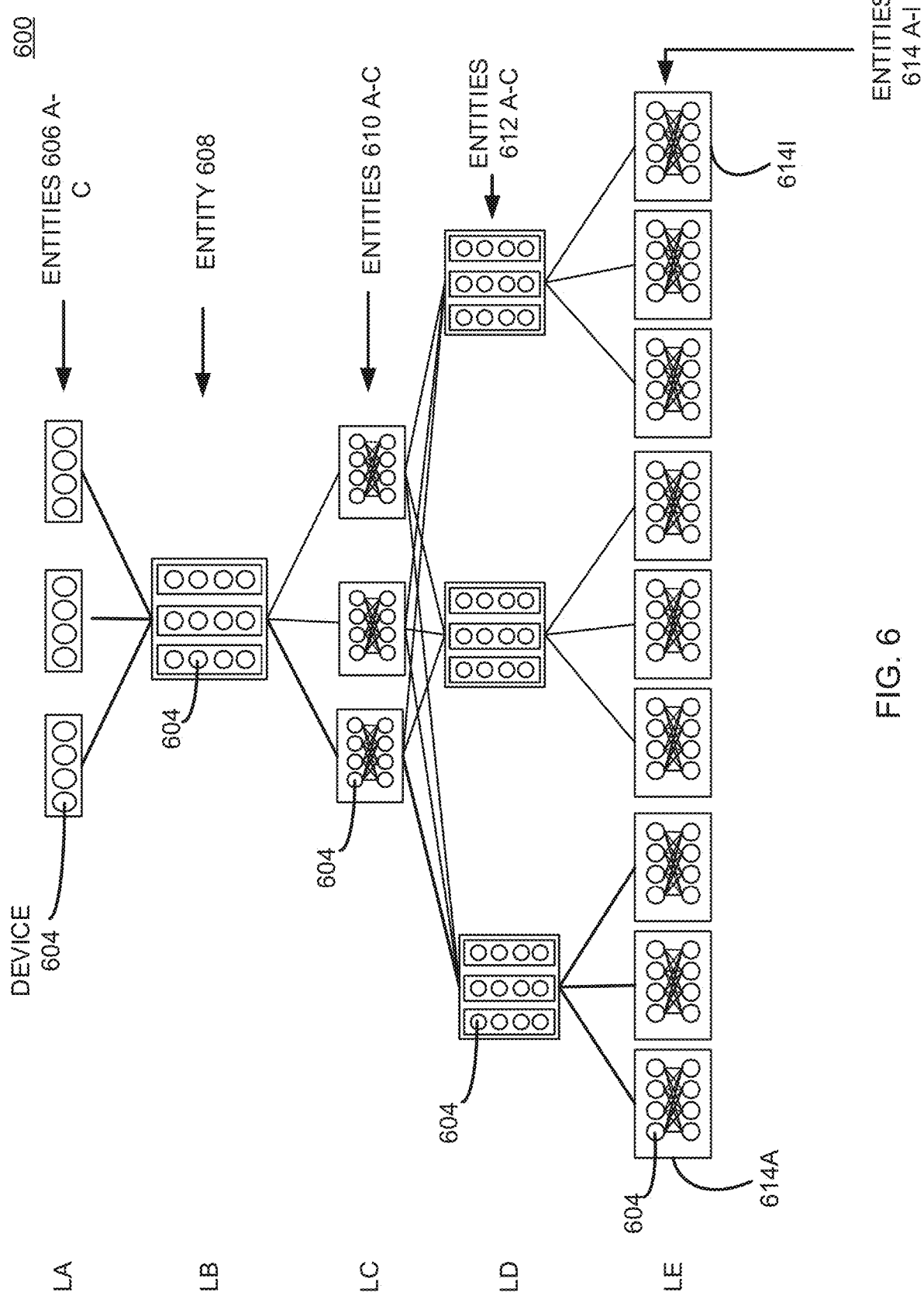
FIG. 6 illustrates a generalized network system, according to an embodiment of the present disclosure.
Figure 7:
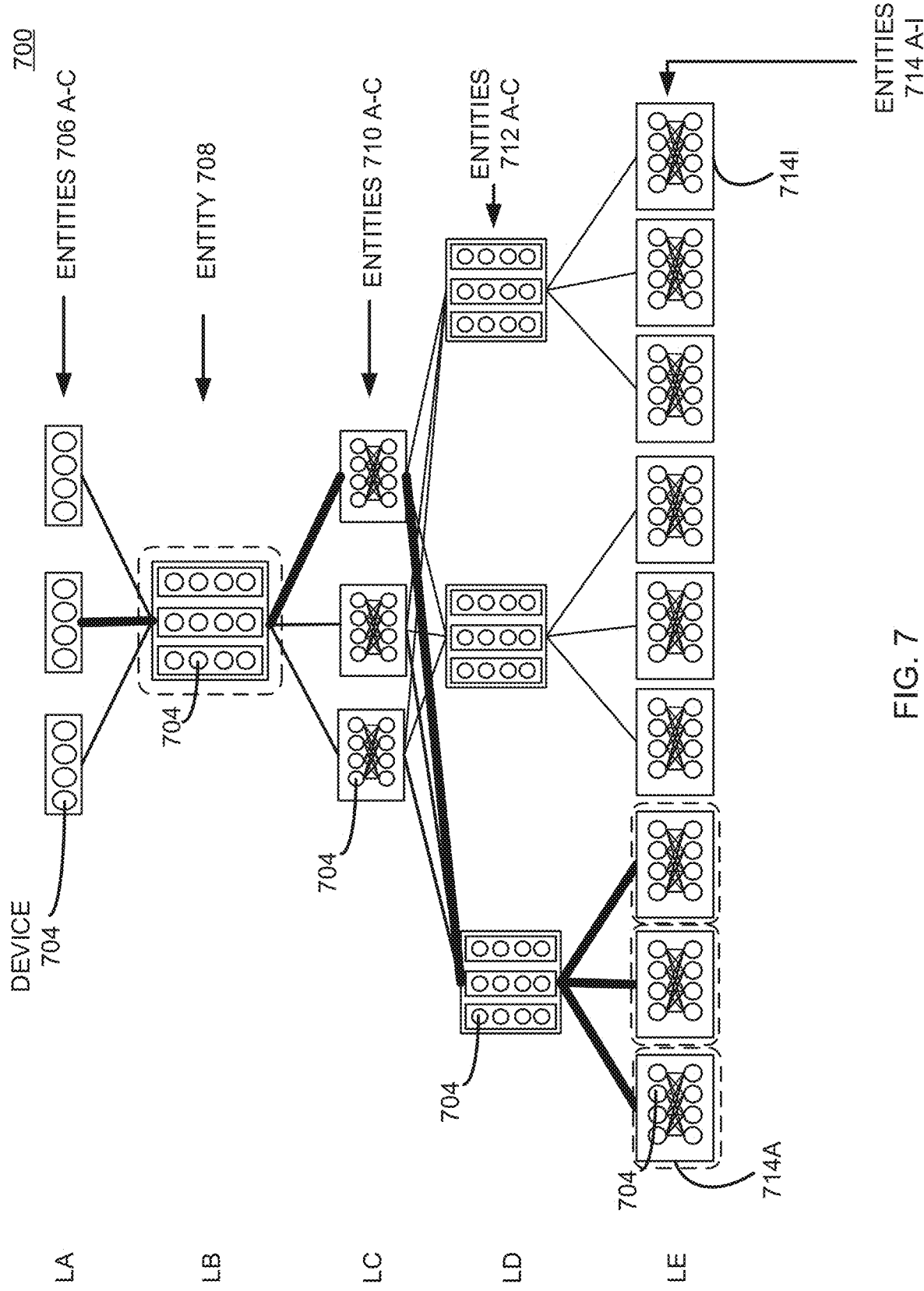
FIG. 7 illustrates network component failure identification according to a model.
Figure 8:
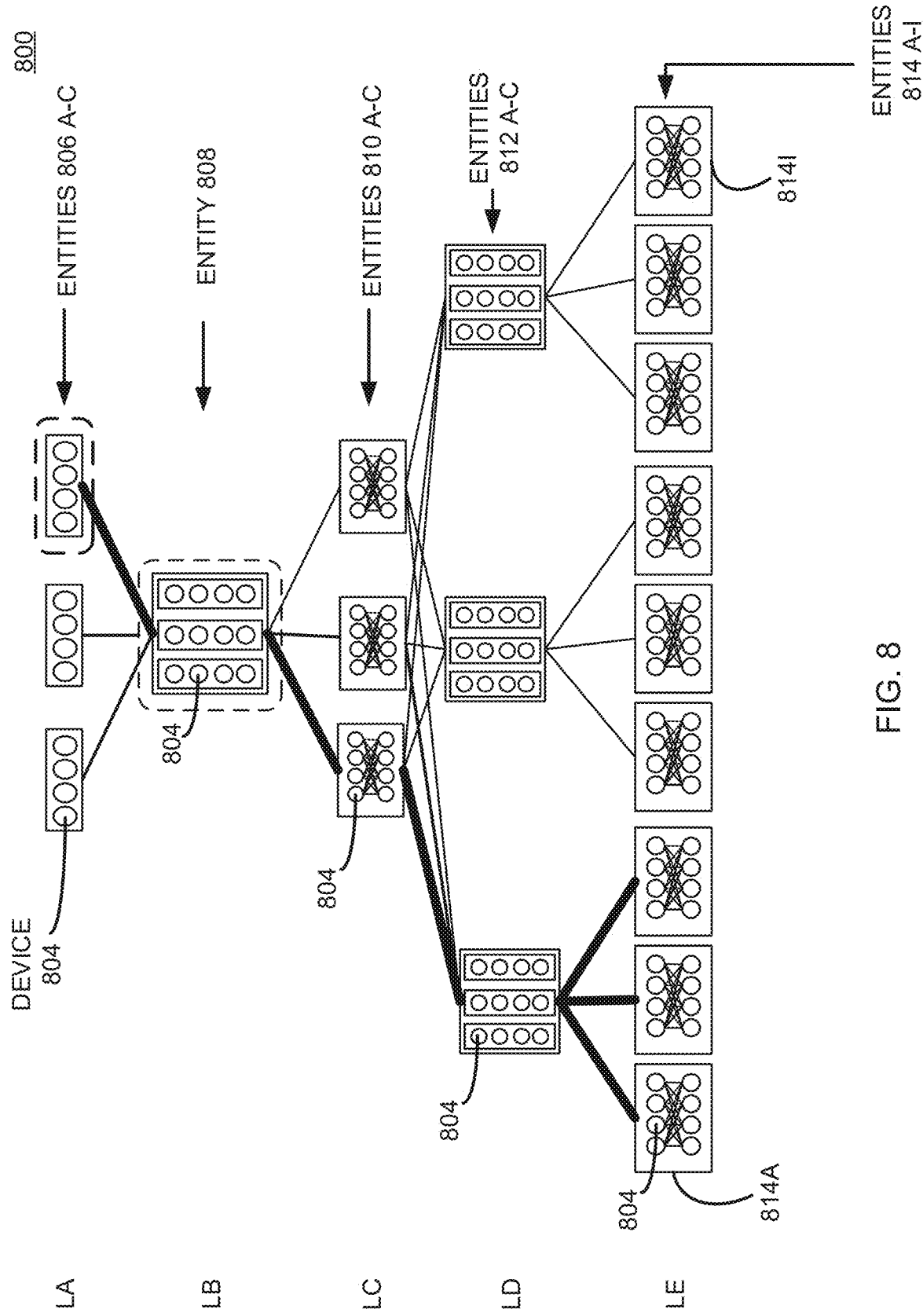
FIG. 8 illustrates network component failure identification according to a different model.

FIGS. 6-8 illustrate a network system 600, according to an embodiment of the present disclosure. The network system 600 includes a plurality of network devices 604 arranged according to a hierarchical graph similarly to FIG. 1. Each layer LA-LE includes one or more entities 606, 608, 610, 612, and 614. Unlike FIG. 1, FIGS. 7-8 illustrate the different paths that may be chosen based on a first cost function set applied to differing statistical models "MN".

In an embodiment, the server collects one or more event data sets which are applied to a statistical model M1 to generate model output data as illustrated in FIG. 7. In FIG. 7, the first cost function as applied to the M1 model output data indicates that the entities 708, 714A, 714B, and 714C are experiencing a network error such as packet loss. The paths identified as being potential network error sources are LA2_LB_LC3_LD1_LE1-3 in descending hierarchical aggregation order. In FIG. 8, the server may applies a first cost function to the model output data of a different statistical model M2. The statistical model M2 may also generate corresponding model output data. As illustrated in FIG. 8, the model output data, as generated by the statistical model M2, may indicate that the entities 806C and 808 are experiencing packet loss along the paths of LA3_LB_LC2_LD1_LE1-3.

As described above, the model output data may include various performance metrics, such as, but not limited to, a number of entities, a number of sub-entities, layer of aggregation and entity event loss. The server may use the cost function to maximize the total or maximum entity event loss while minimizing a spread radius of the estimated packet loss. The spread radius may correspond to a number of entities and sub-entities, a relative distance between the entities, or any other metric. In an example, the server may select the model output data of the statistical model M2 and identify the entity 806C as the entity most likely causing packet loss in the network system 800. The server may further perform one or more actions at the entity 806C.

Figure 9:
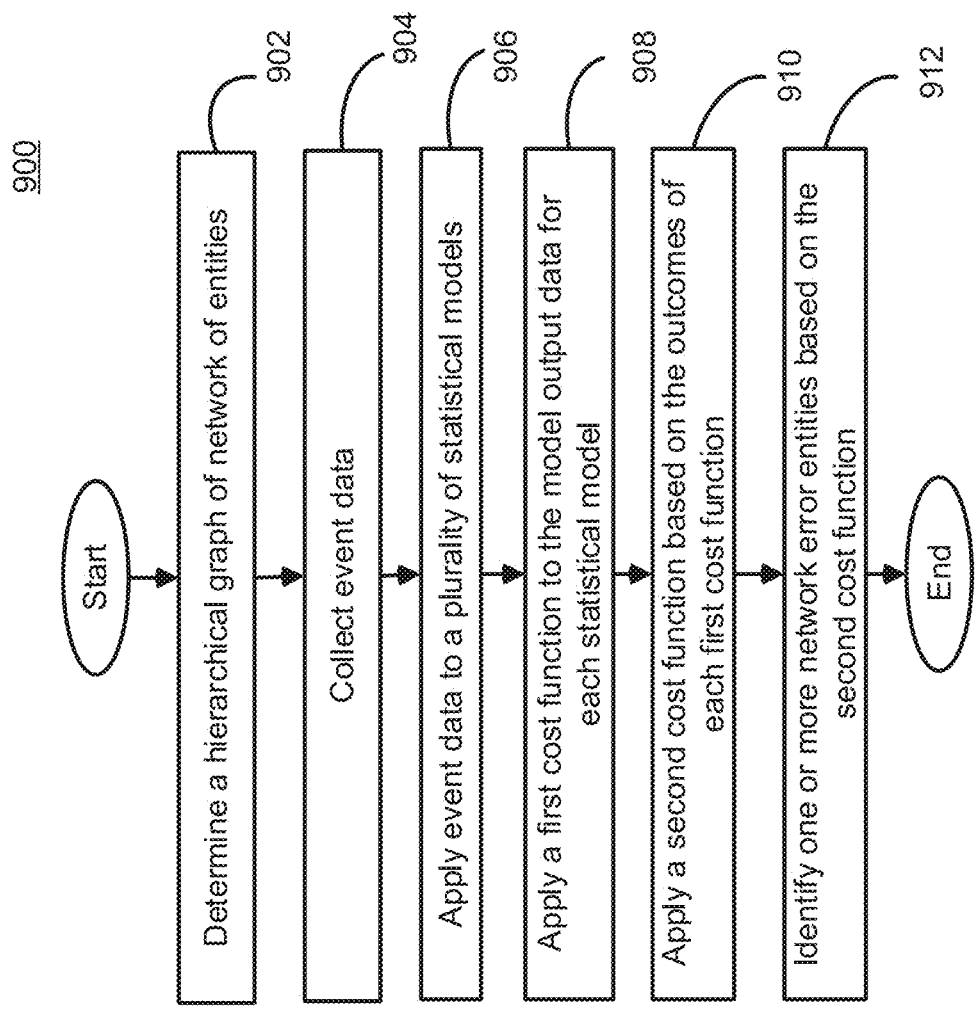
FIG. 9 is a flowchart illustrating a method for identifying one or more entities experiencing a network malfunction, in accordance with an embodiment.

FIG. 9 illustrates a method 900 for identifying one or more entities experiencing packet loss in a network. This flowchart is merely provided for explanatory purposes and may be implemented on the network systems 100, 600, 700 or 800 as illustrated in FIGS. 1 and 6-8.

At process block 902, a server determines a hierarchical graph of a network of entities. The hierarchical graph includes multiple layers, and each layer may include one or more entities. The server 102 may identify a layer corresponding to each of the entities 106-114. Further, each of the entities 106-114 may include one or more network devices 104.

At process block 904, the server collects entity event data from a plurality of entities. Each of the plurality of events may include a predetermined or dynamically determined event data time collection duration, may be triggered by certain unpredicted events, and so forth.

Next at process block 906, the server applies event data to a plurality of statistical models in accordance with various system performance metrics that are desired to be monitored (such as packet loss, traceroute loss, etc.). Each of the statistical models may generate model output data that may be acted upon by the first cost function. The model output data can include one or more performance metrics generated by the applied statistical model. The performance metrics may include, but not limited to, a location of at least one entity in the hierarchical graph, a number of network devices corresponding to the at least one entity and a packet loss data metric for the at least one entity.

At process block 908, the server uses the first cost function to generate a second cost function that can select between various first cost function results based on the model output data corresponding to each statistical model. In some embodiments, the server 102 uses the first cost function to select the model output data of at least one statistical model based on a first predetermined criterion. The first predetermined criterion may include maximizing the packet loss metric per device. In some embodiments, the first predetermined criterion may include selection of the model output data based on the comparison between packet loss metrics generated by the statistical models.

At process block 910, the server generates a set of data based on the function output data corresponding to each of the plurality of events by using a second cost function. The server 102 may execute the cost function module 116 to generate the set of data. In some embodiments, the server 102 uses the second cost function to select the function output data of at least one event based on a second predetermined criterion. The second predetermined criterion may include maximizing the packet loss metric per device.

Next at process block 912, the server determines that one or more entities of the network are suspected as experiencing some form of network error. The server may determine this based on a number of packets that are being lost by the entity, a number of failed traceroutes, etc. This determination could be made using a time-based model (such as a sudden burst of data loss in under a second) or may be cumulative (such as based on a known problematic entity). In an embodiment, the server 102 determines the one or more entities based on the set of data. In some embodiments, the server 102 may perform an action at the one or more entities to prevent or reduce further packet loss in the network. In some embodiments, the server 102 may perform the action at one or more network devices corresponding to the one or more entities experiencing packet loss. The action may include, but not limited to, device shutdown, rerouting traffic from the device, control the network devices of the entity to reject traffic, and so forth. In some other embodiments, the action may include flagging the network devices of the one or more entities in order to notify the other entities of the system 100 about the problem.

The method 900 therefore implements multiple statistical models to identify one or more entities in network experiencing packet loss. In some instances the statistical models may be time-based (e.g. changing probability errors within a certain timeframe), device based (e.g. servers only, etc.)

Figure 10:
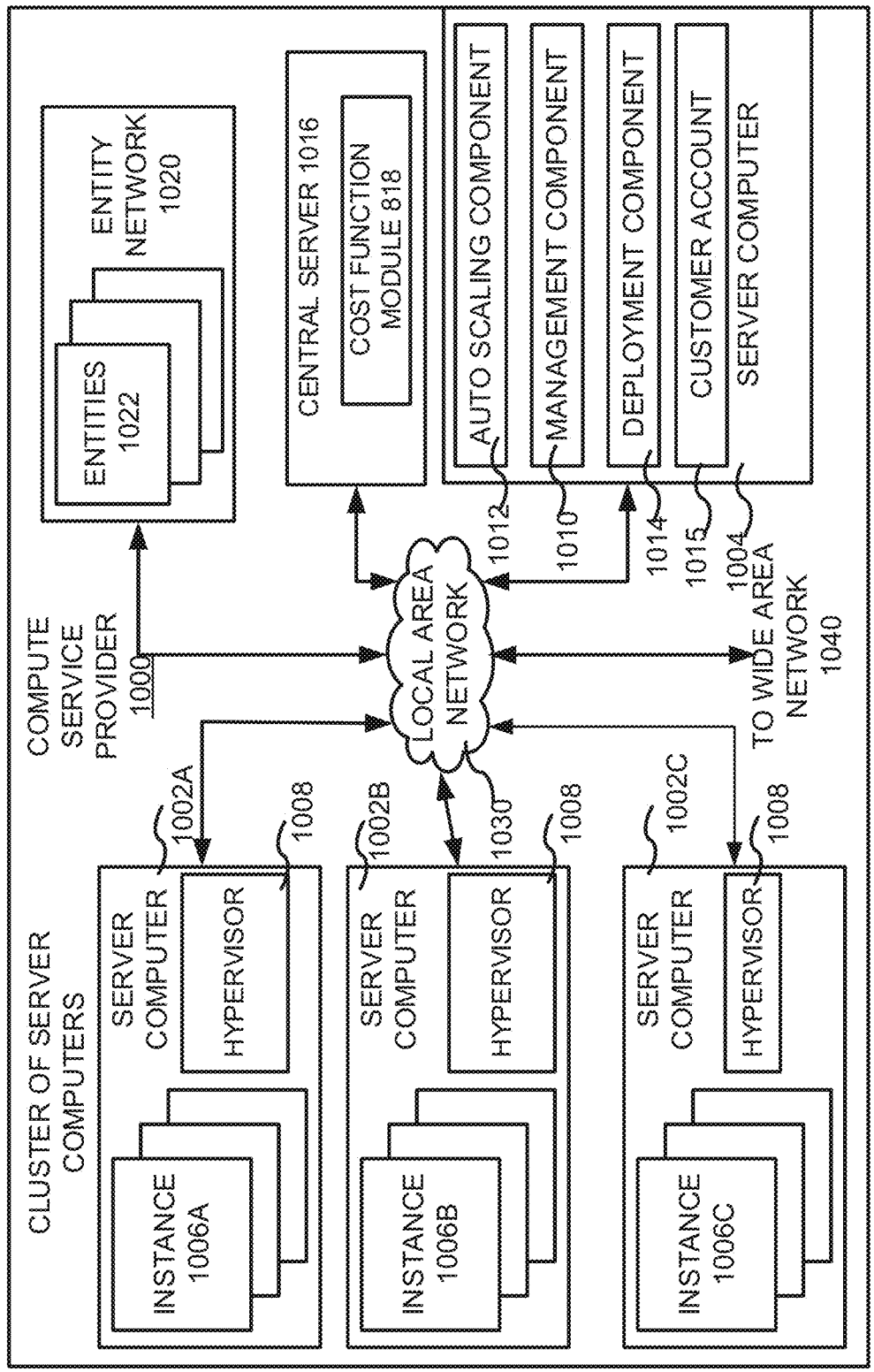
FIG. 10 is an example system diagram showing a plurality of virtual machine instances running in the multi-tenant environment.

FIG. 10 is a computing system diagram of a network-based compute service provider 1000 that illustrates one environment in which embodiments described herein can be used. By way of background, the compute service provider 1000 (i.e., the cloud provider) is capable of delivery of computing and storage capacity as a service to a community of end recipients. In an example embodiment, the compute service provider 1000 can be established for an organization by or on behalf of the organization. That is, the compute service provider 1000 may offer a "private cloud environment." In another embodiment, the compute service provider 1000 supports a multi-tenant environment, wherein a plurality of customers operates independently (i.e., a public cloud environment). The compute service provider 1000 may provide the network models such as, but not limited to, Infrastructure as a Service ("IaaS"), Platform as a Service ("PaaS"), and/or Software as a Service ("SaaS") and so forth. For the IaaS model, the compute service provider 1000 may offer computers as physical or virtual machines and other resources. The virtual machines may be executed as guests by a hypervisor, as described further below. The PaaS model delivers a computing platform that can include an operating system, programming language execution environment, database, and web server. Application developers can develop and run their software solutions on the compute service provider platform 1000 without the cost of buying and managing the underlying hardware and software. The SaaS model allows installation and operation of application software in the compute service provider 1000. In some embodiments, end users may access the compute service provider 1000 using networked client devices, such as desktop computers, laptops, tablets, smartphones, running web browsers, client applications and so forth. Those skilled in the art will recognize that the compute service provider 1000 can be described as a "cloud" environment.

The particular illustrated compute service provider 1000 includes a plurality of server computers 1002A-1002D. While only four server computers are shown, any number can be used, and large centers can include thousands of server computers. The server computers 1002A-1002D may provide computing resources for executing software instances 1006A-1006D. In one embodiment, instances 1006A-1006D are virtual machines. Further, a virtual machine is an instance of a software implementation of a machine (i.e. a computer) that executes applications like a physical machine. In the example of virtual machine, each of the servers 1002A-1002D can be configured to execute a hypervisor 1008 or another type of program configured to enable the execution of multiple instances 1006 on a single server. Additionally, each of the instances 1006 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 1004 can be reserved for executing software components for managing the operation of the server computers 1002 and the instances 1006. For example, the server computer 1004 can execute a management component 1010. A customer can access the management component 1010 to configure various aspects of the operation of the instances 1006 purchased by the customer. For example, the customer can purchase, rent or lease instances and make changes to the configuration of the instances. The customer can also specify settings regarding how the purchased instances are to be scaled in response to demand. An auto-scaling component 1012 can scale the instances 1006 based upon rules defined by the customer. In one embodiment, the auto-scaling component 1012 allows a customer to specify scale-up rules for use in determining when new instances should be instantiated and scale-down rules for use in determining when existing instances should be terminated. The auto-scaling component 1012 can consist of a number of subcomponents executing on different server computers 1002 or other computing devices. The auto-scaling component 1012 can monitor available computing resources over an internal management network and modify resources available based on need.

A deployment component 1014 may be used to assist customers in the deployment of new instances 1006 of computing resources. In some other embodiments, the deployment component 1014 may assist a client in the deployment of a new network device within an existing network group. The deployment component 1014 may have access to account information associated with the instances, such as who is the owner of the account, credit card information, country of the owner, etc. The deployment component 1014 may receive a configuration from a customer that includes data describing how new instances 1006 should be configured. In some other embodiments, the deployment component 1014 may receive information from a client including instruction for the configuration of the newly added device. For example, the configuration can specify one or more applications to be installed in new instances 1006, provide scripts and/or other types of code to be executed for configuring new instances 1006, provide cache logic specifying how an application cache should be prepared, and other types of information. In alternative embodiments, the configuration may specify the similarity metric to be implemented on the newly added network device. The deployment component 1014 can utilize the customer-provided configuration and cache logic to configure, prime, and launch new instances 1006. The configuration, cache logic, and other information may be specified by a customer using the management component 1010 or by providing this information directly to the deployment component 1014. The instance manager can be considered part of the deployment component 1014.

Customer account information 1015 can include any desired information associated with a customer of the multi-tenant environment. For example, the customer account information 1015 may include a unique identifier for a customer, a customer address, billing information, licensing information, customization performance metrics for launching instances, scheduling information, auto-scaling performance metrics, previous IP addresses used to access the account, etc. In this way, through the customer account, a customer or administrator can setup the account into an authorization check only mode, wherein each received Application Programming Interface (API) does not get performed, but is checked to determine permissions and a result returned accordingly.

A network 1030 can be utilized to interconnect the server computers 1002A-1002D and the server computer 1004, 1050. The network 1030 can be a local area network (LAN) and can be connected to a Wide Area Network (WAN) 1040 so that end users can access the compute service provider 1000. It should be appreciated that the network topology illustrated in FIG. 10 has been simplified and that many more networks and networking devices can be utilized to interconnect the various computing systems disclosed herein.

An entity network 1020 including one or more entities 1022 may also transmit and receive data to and from various components of the compute service provider 1000. The entities 1022 may be arranged in a hierarchical graph including multiple layers. Each entity 1022 may be a group of one or more network devices.

A central server 1016 including a cost function module 1018 may also be connected with the entity network 1020. The central server 1016 may be similar to the server 102, as described above with reference to FIG. 1. The cost function module 1018 may be similar to the cost function module 116, as shown in FIG. 1. In some embodiments, the central server 1016 may execute the cost function module 1018 to generate one or more sets of data. The central server 1016 may further identify one or more entities 1022 as experiencing packet loss within the entity network 1020. The central server 1016 may also perform one or more actions at the one or more entities 1022 that are experiencing packet loss. In other embodiments, the central server 1016 may also be communicably coupled to the server computer 1004. The central server 1016 may transmit information regarding packet loss in the entity network 1020 to the server computer 1004. The auto-scaling component 1012 of the server computer 1004 may add or remove network devices based on the information received from the central server 1016.

Figure 11:
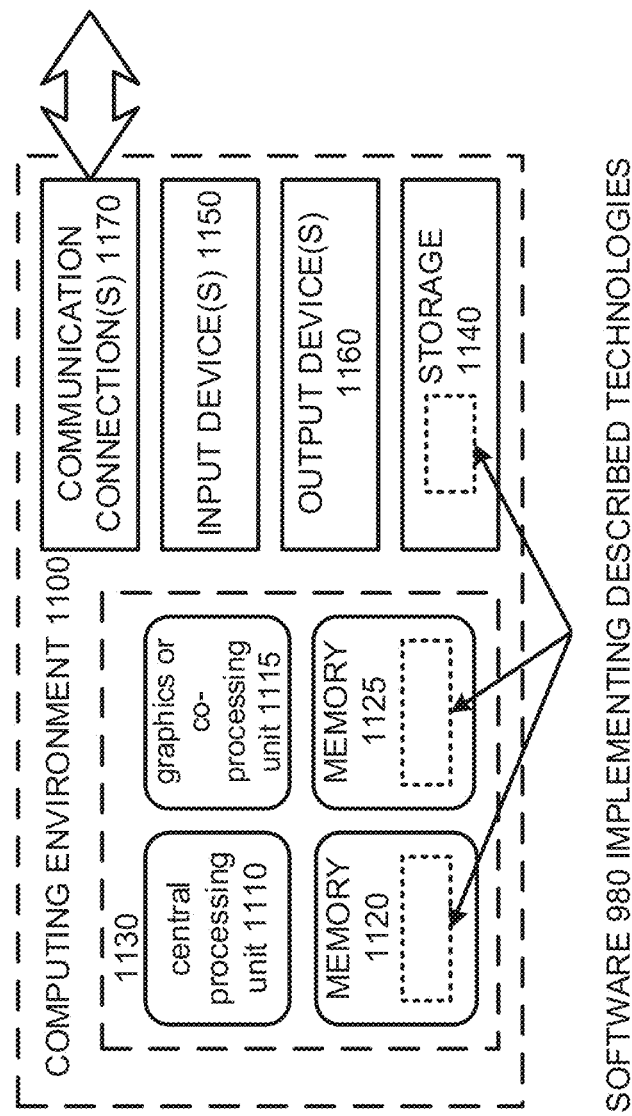
FIG. 11 depicts a generalized example of a suitable computing environment in which the described innovations may be implemented.

With reference to FIG. 11, the computing environment 1100 includes one or more processing units 1110 and 1115. The computing environment 1100 further includes memory units 1120 and 1125. In FIG. 11, this basic configuration 1130 is included within a dashed line. The processing units 1110 and 1115 execute computer-executable instructions. A processing unit can be a general-purpose Central Processing Unit (CPU), processor in an Application-Specific Integrated Circuit (ASIC) or any other type of processor. In a multi-processing system, multiple processing units execute computer-executable instructions to increase processing power. For example, the processing unit 1110 may be a central processing unit while the processing unit 1115 may be a graphics processing unit or co-processing unit. The tangible memory units 1120 and 1125 may be volatile memory (e.g., registers, cache, RAM), non-volatile memory (e.g., ROM, EEPROM, flash memory, etc.), or some combination of the two, accessible by the processing units 1110 and 1115. The memory units 1120 and 1125 stores software 1180 implementing one or more innovations described herein, in the form of computer-executable instructions suitable for execution by the processing units 1110 and 1115.

The computing environment 1100 may have additional features. For example, the computing environment 1100 includes a storage unit 1140 (or storage 1140), one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, a printer, a speaker, a CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed on, but not limited to, a single local computer (e.g., any suitable commercially available computer), a network environment (e.g., via the Internet, a wide-area network, a local-area network), a client-server network (such as a cloud computing network), and the like, using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in any suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of these claims.

What is claimed is:

1. A method for determining a source of a network entity failure on a network, comprising:
  by a server computer:
    constructing a plurality of hierarchical aggregation layers, wherein each aggregation layer includes one or more of a plurality of network entities;
    classifying each network entity of the plurality of network entities into a hierarchical aggregation layer based on a number of downstream data paths from each network entity, wherein a higher layer of an aggregation graph has a higher number of downstream data paths than a lower layer of the aggregation graph;
    collecting a plurality of event data sets, wherein each of the plurality of event data sets comprises information obtained from a transmission of data between two or more network entities of the plurality of network entities;

applying the plurality of event data sets to a plurality of statistical models, wherein each of the statistical models generates model output data for each of the plurality of event data sets;

applying a first cost function to each of the model output data, the first cost function identifying one or more of the network entities of the plurality of network entities as a potential source of a network error;

applying a second cost function to at least two of the identified network entities made by the first cost function; and determining that one or more network entities of the plurality of network entities is experiencing a network error based on the second cost function.

2. The method of claim 1, wherein collecting the plurality of event data sets comprises monitoring an exchange of network packets between a source entity and a destination entity of the plurality of network entities, and storing a record of the exchange in a memory of the server computer.

3. The method of claim 1, further comprising performing an action on the one or more network entities identified as experiencing a network entity failure including any one of re-routing network traffic around an identified network entity, re-starting an identified network entity, or generating a system message regarding the status of an identified network entity.

4. The method of claim 1, wherein generating the model output data comprises using the first cost function to modify the model output data of at least one statistical model based on a first predetermined criterion including at least one of packet loss or traceroute loss.

5. The method of claim 1, wherein generating the model output data comprises using the first cost function to modify the model output data of at least one statistical model based on a first predetermined criterion including a size of the differences between an entity event-loss between two statistical models relative to a size of the differences between a number of sub-entities associated with the two statistical models.

6. A non-transitory computer readable medium storing instructions that upon execution by one or more processors cause a computer system to:

collect a network error event data set based on a communication between two or more network entities;

apply the collected network error data set to a plurality of statistical models, wherein each of the statistical models generates different model output data for the network error event data set, wherein a second cost function is generated to select the model output data in conjunction with a first cost function from one or more of the plurality of statistical models; and determine if one or more network entities in the network is experiencing a network error based on the selected model output data.

7. The non-transitory computer readable medium of claim 6, further comprising:

grouping the two or more network entities into a plurality of hierarchical layers based on a number of downstream connections for each network entity.

8. The non-transitory medium of claim 7, wherein the event data for a given statistical model at a given hierarchical layer comprises an estimation of a total number of packets lost by a network entity, a number of packets lost during an event, a ratio of the estimation of the total number of packets lost by the entity to the number of packets lost during the event, or a number of sub-entities in higher hierarchical layers above the given hierarchical layer.

9. The non-transitory medium of claim 6, wherein first cost functions influence the output data from each of the plurality of statistical models to determine which of the one or more network entities is experiencing the network error, and a second cost function selects one of the first cost functions.

10. The non-transitory medium of claim 6, further comprising performing an action on the one or more network entities determined to be experiencing a network error based on the model output data including at least one of re-routing network traffic around an identified entity, re-starting an identified entity, or generating a system message regarding the status of an identified entity.

11. The non-transitory medium of claim 6, wherein the model output data includes a location of a network entity in the plurality of hierarchical layers, a number of network devices corresponding to the network entity, a packet loss data metric corresponding to the network entity, or traceroute data corresponding to the network entity.

12. The non-transitory medium of claim 6, wherein determining which network entity is experiencing the network error comprises calculating a maximized packet loss metric by a first cost function.

13. The non-transitory medium of claim 12, wherein the cost function is comprised of a hierarchical layer, a set of network entities, a number of entities in the set of network entities, a number of sub-entities, or an entity event loss.

14. The non-transitory medium of claim 6, wherein a first cost function is applied to the model output data based on a comparison between packet loss metrics between network entities.

15. A system, comprising:

a plurality of network entities arranged in a network, wherein each of the plurality of network entities includes one or more network devices; and a server coupled to the network, the server configured to:

classify the plurality of network entities according to a number of hierarchical aggregation layers, wherein each hierarchical aggregation layer is populated by at least one entity of the plurality of network entities;

collect an event data set from a plurality of network entity transactions;

apply the collected event data set to a plurality of statistical models, wherein each of the statistical models generates model output data for the collected data set;

apply a first cost function to two or more of the plurality of model output data to determine at least one network entity experiencing a network error;

apply a second cost function to the plurality of outcomes from the first cost function being applied to the plurality of statistical models; and determine one or more network entities of the network experiencing packet loss based on the second cost function.

16. The system of claim 15, wherein the server is configured to perform an action on the one or more network entities identified as experiencing packet loss including any one of re-routing network traffic around an identified entity, re-starting an identified entity, or generating a system message regarding the status of an identified entity.

17. The system of claim 16, wherein the event data for a given statistical model at a given aggregation layer comprises an estimation of a total number of packets lost by a network entity, a number of packets lost during an event, a ratio of the estimation of the total number of packets lost by the entity to the number of packets lost during the event, or a number of sub-entities in higher hierarchical layers above the given hierarchical layer.

18. The system of claim 16, wherein the model output data includes at least one of a location of a network entity in a hierarchical layer, a number of network devices corresponding to the network entity, or a packet loss data metric for the network entity.

19. The system of claim 16, wherein the network is a Clos network.

* * * * *